United States Patent Office 3,415,869
Patented Dec. 10, 1968

3,415,869
DIBENZOYL ESTERS OF N-(METHYL OR ETHYL)-
N-[N'-(METHYL OR ETHYL)-N'-(α-ETHYL-β-HY-
DROXYETHYL) - β - AMINOETHYL] - β - ETHYL-
β-AMINOETHANOL
Raymond George Wilkinson, Montvale, and Robert Gordon Shepherd, Ridgewood, N.J., assignors to American Cyanamid Company, Stamford, Conn., a corporation of Maine
No Drawing. Original application Jan. 23, 1962, Ser. No. 168,241, now Patent No. 3,176,040, dated Mar. 30, 1965. Divided and this application Feb. 12, 1965, Ser. No. 432,420
Claims priority, application Great Britain, Feb. 7, 1961, 4,517/61
2 Claims. (Cl. 260—477)

ABSTRACT OF THE DISCLOSURE

This disclosure describes compounds of the class of dibenzoyl esters of N-(methyl or ethyl)-N-[N'-(methyl or ethyl)-N'-(α-ethyl-β-hydroxyethyl)-β-aminoethyl] - β-ethyl-β-aminoethanol which possess activity against experimental human strain tuberculosis in mice.

---

This application is a division of our copending application Ser. No. 168,241, filed Jan. 23, 1962, now Patent 3,176,040, which is a continuation-in-part of our application Ser. No. 77,034, filed Dec. 20, 1960, now abandoned, which is a continuation-in-part of our application Ser. No. 33,399, filed June 2, 1960, now abandoned. Applicants claim priority under their British application Ser. No. 4,517, filed Feb. 7, 1961 (License No. 261,516 dated Jan. 27, 1961), now British Patent No. 961,317, for all that is disclosed therein which is not disclosed in their applications Ser. No. 33,399 and Ser. No. 77,034.

This invention relates to novel symmetrical ethylenediamines and, more particularly, is concerned with derivatives of N-[N'-(α-ethyl-β-hydroxyethyl)-β-aminoethyl]-β-ethyl-β-aminoethanol which may be represented by the following general formula:

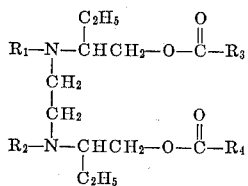

wherein $R_1$ and $R_2$ are the same and are methyl or ethyl; and $R_3$ and $R_4$ are the same and are phenyl or substituted phenyl. Suitable substituted phenyl groups contemplated by the present invention are, for example, p-nitrophenyl, p-methoxyphenyl, p-chlorophenyl, 3,4-methylenedioxyphenyl, etc.

The novel compounds of the present invention are, in general, white crystalline solids of colorless oils, soluble in lower alkanols and variably soluble in water, acetone, choroform, ether, benzene, petroleum ether and the like. The acid-addition salts of the novel compounds of the present invention are, in general, soluble in water and hot alkanols, but relatively insoluble in non-polar organic solvents such as benzene, ether and the like. The non-toxic acid-addition salts of the novel symmetrical ethylenediamines of the present invention with a variety of organic and inorganic acids are also included within the scope of the invention. Thus, acid-addition salts formed by admixture of the organic free base with an acid, suitably in a neutral solvent, are formed with such acids as sulfuric, phosphoric, hydrochloric, hydrobromic, citric, lactic, tartaric, acetic, benzoic, ascorbic and the like. For purposes of this invention, the organic free bases are equivalent to their non-toxic acid-addition salts.

In testing the compounds of the present invention for anti-tuberculous activity the organism used in the test is Mycobacterium tuberculosis (H37Rv). The test animals are white female mice. The test animals are infected with the organisms by administration intravenously of 0.2 ml. of a buffered saline suspension containing approximately 1.5 mg./ml., wet weight, of a 12 or 13 day culture of the test organism grown on solid Sauton's medium composed of: 0.05 gm. iron ammonium citrate; 0.5 gm. dipotassium phosphate; 0.5 gm. magnesium sulfate; 2.0 gm. citric acid; 4.0 gm. asparagine; 35.0 ml. gylcerine; dist. water q.s. 1000 ml.

During a one year experience with this test, the standard infection defined above caused a 99.5% mortality, in that 756 of the 760 infected untreated control mice died within 30 days, the normal period of the test. Routinely, each week 200–300 mice are given the standard infection and then segregated in a random manner into cages each of which holds five or ten mice. Four groups of five mice each are retained as untreated controls, and the remaining mice are used to ascertain drug activity.

Drug treatment is administered orally as follows: A measured amount of the compound to be tested is mixed with a weighed amount of feed, and the test animals are allowed to feed at will for 14 days from the time of infection—the controls, of course, on untreated feed. All surviving animals are then allowed to feed at will on untreated feed for the remainder of the 30 day test period. A compound is judged active if it either saves 2 or more of the 5 mice in the test group, or prolongs average survival time by 4 or more days, compared to untreated controls.

The intermediate N-[N'-(α-ethyl-β-hydroxyethyl)-β-aminoethyl]-β-ethyl-β-aminoethanol may be readily prepared by the interaction of an ethylene dihalide with two equivalents of 2-amino-1-butanol. In like manner, the intermediate N,N'-dimethyl and N,N'-diethyl derivatives of N - [N' - (α - ethyl-β-hydroxyethyl)-β-aminoethyl]-β-ethyl-β-aminoethanol may also be readily prepared by the interaction of an ethylene dihalide with two equivalents of 2-methylamino-1-butanol or 2-ethylamino-1-butanol, respectively. This preparative method is illustrated by Examples 1 and 3 hereinafter. The N-[N'-(α-ethyl-β-hydroxyethyl)-β-aminoethyl]-β-ethyl-β-aminoethanol and its N,N'-dimethyl and N,N'-diethyl derivatives may also be conveniently prepared by the interaction of glyoxal with 2-amino-1-butanol, 2-methylamino-1-butanol or 2-ethylamino-1-butanol, respectively, followed by reduction of the Schiff base intermediates with lithium aluminum hydride. This method is illustrated by Example 5 hereinafter. The N,N'-dimethyl derivative of N-[N'-(α-ethyl-β-hydroxyethyl) - β - aminoethyl] - β-ethyl-β-aminoethanol may also be readily prepared by treatment of N-[N'-(α-ethyl - β - hydroxyethyl)-β-aminoethyl]-β-ethyl-β-aminoethanol with formaldehyde in concentrated formic acid. This method is illustrated by Example 2 hereinafter. The N,N'-diethyl derivative of N-[N'-(α-ethyl-β-hydroxyethyl)-β-aminoethyl]-β-ethyl-β-aminoethanol may also be readily prepared by treating the N-[N'-(α-ethyl-β-hydroxyethyl)-β-aminoethyl]-β-ethyl-β-aminoethanol with excess acetic anhydride and reducing the intermediate N,N',O,O'-tetra-acetyl derivative with lithium aluminum hydride, the O-acetyl functions being removed during the reduction. This method is illustrated by Example 4 hereinafter.

The O,O'-di(benzoyl) derivatives of N-methyl-N-[N'-methyl - N' - (α-ethyl-β-hydroxyethyl)-β-aminoethyl]-β-ethyl - β - aminoethanol and N-ethyl-N-[N'-ethyl-N'-(α-ethyl-β-hydroxyethyl)-β-aminoethyl]-β-ethyl - β - aminoethanol may be readily prepared by treating the appropriate ethylenediamine base with a benzoyl halide or a substituted benzoyl halide. This method is illustrated by Examples 6 and 7 hereinafter.

The following examples illustrate the preparation of typical symmetrical ethylenediamines of the present invention.

EXAMPLE 1

N-[N'-(α-ethyl-β-hydroxyethyl)-β-aminoethyl]-β-ethyl-β-aminoethanol

To 227 g. (2.55 moles) of 2-amino-1-butanol was added 100 g. (1.0 mole) of ethylene dichloride. The mixture was heated at reflux and in a few minutes the exothermic reaction required the removal of exterior heating. After 10 minutes, exterior heating was recommenced for an additional 20 minutes. The hot mixture was then treated with 300 ml. of methanol and then cautiously with 84 g. (2.1 moles) of sodium hydroxide in 80 ml. of water. The precipitated sodium chloride was removed by filtration. The excess 2-amino-1-butanol distilled as a light yellow oil at 83–87° C./13 mm. The viscous residue distilled at 165–170° C./0.6 mm. as a light yellow oil which tended to solidify in the air condenser; yield, 108 g. Recrystallization by dissolving in 80 ml. of hot ethanol, adding about 150 ml. of petroleum ether (B.P. 90–100° C.), and cooling at 5° C. overnight, gave 64 g. of white crystals melting at 128–132.5° C. This, on recrystallization from 100 ml. of 95% ethanol, gave 35 g. of white crystals melting at 134.5–136° C. and a second crop of 10 g. melting at 132.5–134° C. which is the meso base. Its dihydrochloride melts at 202–203° C.

From the ethanolic filtrates upon addition of 130 ml. of about 4 N ethanolic hydrochloric acid and cooling, there was obtained 55 g. of white crystals melting at 176.5–178° C. and a second crop of 10 g. melting at 171.5–174.5° C. This is the dl racemate dihydrochloride.

EXAMPLE 2

N-methyl-N-[N'-methyl-N'-(α-ethyl-β-hydroxyethyl)-β-aminoethyl]-β-ethyl-β-aminoethanol To 16.5 g. (0.36 mole) of 98% formic acid was added 10.0 g. (0.048 mole) of N-[N'-(α-ethyl-β-hydroxyethyl)-β-aminoethyl]-β-ethyl-β-aminoethanol in portions, with cooling. Then, 9.0 g. (0.105 mole) of 37% formaldehyde was added and the mixture was heated on the steam bath. After evolution of carbon dioxide ceased, refluxing was continued for an additional six hours. The solution was cooled, treated with 15 ml. of conc. HCl and filtered prior to refluxing for 1.5 hours. After vacuum evaporation, the resulting yellow viscous liquid was treated with 25% NaOH and the organic layer extracted into benzene. The combined extracts were dried over anhydrous Na₂CO₃ and concentrated leaving an oily residue which on distillation under high vacuum yielded the product as a colorless oil, 7.4 g., B.P. 132–134° C./0.01 mm.

EXAMPLE 3

N-ethyl-N-[N'-ethyl-N'-(α-ethyl-β-hydroxyethyl)-β-aminoethyl]-β-ethyl-β-aminoethanol A mixture of 33 g. (0.28 mole) of 2-ethylamino-1-butanol and 13.2 g. (0.07 mole) of ethylene dibromide was heated to reflux for 2 hours with a vigorous initial reaction. To the cooled mixture 30 ml. of 10 N NaOH was added and the resulting oil layer was extracted with benzene. After drying over anhydrous Na₂CO₃ the benzene and excess 2-ethyl-amino-1-butanol were distilled and the residue, 12 g., distilled at 90–130° C./0.02 mm. On redistillation, the product boiled at 135–138° C./0.07 mm.

EXAMPLE 4

N-ethyl-N-[N'-ethyl-N'-(α-ethyl-β-hydroxyethyl)-β-aminoethyl]-β-ethyl-β-aminoethanol An alternate method of preparing the product of Example 3 is to treat N-[N'-(α-ethyl-β-hydroxyethyl)-β-aminoethyl]-β-ethyl-β-aminoethanol with excess acetic anhydride to obtain the N,N',O,O'-tetra-acetyl derivative. By reduction of this intermediate with lithium aluminum hydride in diethyl ether at the reflux temperature for a period of several hours, the desired N,N'-diethyl derivative is obtained, the O-acetyl functions being removed during the reaction.

EXAMPLE 5

N-[N'-(α-ethyl-β-hydroxyethyl)-β-aminoethyl]-β-ethyl-β-aminoethanol

To 6.0 g. (0.03 mole) of 30% aqueous glyoxal was added 9.2 g. of 2-aminobutanol (with moderate heat evolution) and 30 ml. of absolute ethanol. A total of 3.7 g. (0.1 mole) of sodium borohydride was added in portions over 10 minutes. The reaction mixture, after the vigorous reaction had subsided, was heated for 30 minutes. On adding water and extracting with chloroform, the meso isomer, M.P. 131–134° C., was isolated on cooling. The dl isomer was isolated as the dihydrochloride salt, M.P. 172–175° C. on acidifying the filtrate with ethanolic HCl.

EXAMPLE 6

N-methyl-N-[N'-methyl-N'-(α-ethyl-β-hydroxyethel)-β-aminoethyl]-β-ethyl-β-aminoethanol dibenzoyl ester A solution of 21.8 g. of dextro N-methyl-N-[N'-methyl-N'-(α-ethyl-β-hydroxyethyl)-β-aminoethyl]-β-ethyl-β-aminoethanol in 25 ml. of benzene was added slowly to a suspension of 30.8 g. of benzoyl chloride in 22.2 g. of triethylamine and 100 ml. of benzene. The reaction mixture was refluxed for one hour, the suspended solids removed by filtration, and the filtrate concentrated to a dark oil. This residue was dissolved in 300 ml. of ether and saturated with hydrogen chloride whereby a white crystalline solid precipitated. After heating with 1 liter of acetone, the white solid was collected by filtration and dried. Recrystallization from 700 ml. of ethanol gave the dextro N-methyl-N[N'-methyl-N' - (α-ethyl-β-hydroxyethyl)-β-amino-ethyl]-β-ethyl-β-aminoethanol dibenzoyl ester dihydrochloride, M.P. 222–224° C.

EXAMPLE 7

N-methyl-N-[N'-methyl-N' - (α-ethyl-β-hydroxyethyl)-β-amino-ethyl]-β-ethyl-β-aminoethanol di-(4-chloro)benzoyl ester By replacing the benzoyl chloride employed in Example 6 by an equimolar quantity of 4-chlorobenzoyl chloride and following substantially the same procedure described in Example 6, there was obtained the dextro N-methyl-N-[N'-methyl-N' - (α-ethyl-β-hydroxyethyl)-β-aminoethyl]-β-ethyl-β-amino-ethanol di - (4-chloro)benzoyl ester dihydrochloride as a white crystalline solid, M.P. 225° C. (dec.).

What is claimed is:

1. A compound selected from the group consisting of N-methyl-N-[N'-methyl-N' - (α-ethyl-β-hydroxy-ethyl)-β-aminoethyl]-β-ethyl-β-aminoethanol dibenzoyl ester and the non-toxic acid-addition salts thereof.

2. A compound selected from the group consisting of N-methyl-N - [N'-methyl-N' - (α-ethyl-β-hydroxy-ethyl)-β-aminoethyl] - β-ethyl-β-aminoethanol di(4-chloro)-benzoyl ester and the non-toxic acid-addition salts thereof.

References Cited

FOREIGN PATENTS 613,545   8/1962   Belgium.

NICHOLAS S. RIZZO, Primary Examiner.

J. H. TURNIPSEED, Assistant Examiner.

U.S. Cl. X.R.

260—340.5, 472, 490, 501, 584; 167—65